Oct. 16, 1956  G. K. BOYER  2,766,834
VALVE FOR SIMULTANEOUS OR SELECTIVE CONTROL OF
MOWER TRACTION MOTORS
Filed Oct. 5, 1953  3 Sheets-Sheet 1

INVENTOR.
GEORGE K. BOYER
BY
ATTORNEY

*INVENTOR.*
GEORGE K. BOYER
BY
ATTORNEY

Oct. 16, 1956     G. K. BOYER     2,766,834
VALVE FOR SIMULTANEOUS OR SELECTIVE CONTROL OF
MOWER TRACTION MOTORS
Filed Oct. 5, 1953                           3 Sheets-Sheet 3

*INVENTOR.*
GEORGE K. BOYER
BY
ATTORNEY

United States Patent Office 2,766,834
Patented Oct. 16, 1956

2,766,834

VALVE FOR SIMULTANEOUS OR SELECTIVE CONTROL OF MOWER TRACTION MOTORS

George K. Boyer, Kansas City, Mo.

Application October 5, 1953, Serial No. 384,145

1 Claim. (Cl. 180—6.48)

This invention relates to an improved mowing machine having fluid driven motors actuating traction wheels with an improved control valve for driving, reversing and steering the mowing machine.

Heretofore mowing machines have been operated by fluid motors mounted on the traction wheels with the usual or conventional tongue fulcrumed to be manually raised and lowered but anchored to the mowing machine for manually turning the mower to the right or left and must be manually pulled rearwardly.

This improved invention is for a mower having the supporting wheels actuated by fluid pressure motors with an improved control valve mounted in the fluid pressure control lines between a prime mover actuated pump and the fluid pressure motors with means to start the motors, drive forward, drive in reverse, drive only the right wheel in either direction, or drive only the left wheel in either direction whereby the mower may be power driven in either direction or power steered to the right or left in forward or reverse driving direction.

This new type control valve may be operated by a person walking behind the mower, or from a seat not shown which may be extended from the mower for carrying the operator.

Another object of the improved invention is to provide a handle and tongue actuator of the improved control valve that will fulcrum on the mower to swing upward or downward by the walking operator in the natural movement of traversing the terrain, journaled to rotate a fraction of a turn to the right or left by the pull of the operator to actuate the control valve for a left or right wheel drive respectively, slide forward for a forward drive and slide rearward for a rearward drive, the neutral or stop position being between the foward and rearward slide position. The movements of the operator are all natural movements for a conventional mower but control the improved fluid power drive of the mower.

With all or any portion of these objects in view the invention will be more fully understood from the drawings, the following description and the scope of the appended claim.

Figure 1:
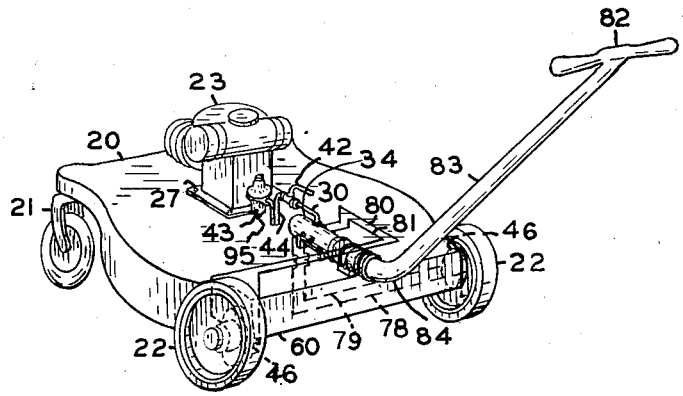
Figure 1 is a perspective view of a mower illustrating the improved control valve, handle and tongue actuator of the control valve.
Figure 2:
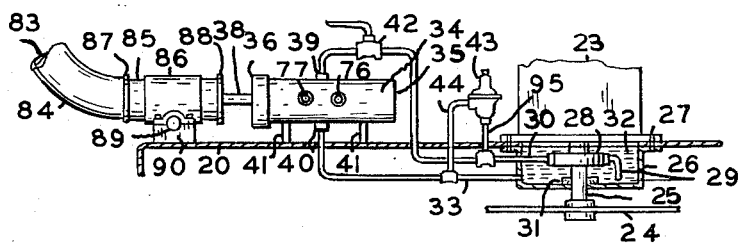
Figure 2 is an enlarged fragmentary view illustrating the prime mover, pump, sump, rotary cutter, control valve, tongue actuator of the valve, and fluid pressure conduits with fluid pressure controls, all being attached to a fragment of the base of the mower.

The conventional mower flat base 20 is supported by two front caster wheels 21, one not being shown in the perspective left rear view of Figure 1, two spaced traction wheels 22 support the rear of the base 20, a prime mover 23, preferably a gas engine, is mounted on the flat base 20, a conventional rotating cutter 24 is mounted on the shaft 25 of the prime mover 23, and to this old construction is added the improved construction as follows:

A fluid reservoir 26 is preferably mounted below the mower base 20 and prime mover 23, all being bolted together by bolts 27. A fluid pressure pump 28 is preferably mounted on the shaft 25 of the prime mover 23, is located inside of the reservoir 26 having a suction pipe 29, and fluid pressure conduit line 30 extended through the fluid reservoir 26. A seal member 31 is mounted in the fluid reservoir 26 and on shaft 25 to retain the fluid 32 in the fluid reservoir 26. A fluid return conduit line 33 is connected to the fluid reservoir 26.

The improved fluid pressure control valve 34 is of cylindrical shape with a closed head 35 and a detachably attached head 36. The head 36 is provided with a seal member 37 mounted around the valve slide rod 38 to retain the fluid under pressure within the control valve 34. The control valve 34 has a fluid pressure inlet port 39 preferably on the top thereof, a fluid relief port 40 preferably on the bottom thereof connected to the fluid return conduit line 33, and the connection lugs 41 connected with the mower base 20 by any well known method such as bolting or welding.

The fluid pressure conduit line 30 extends to inlet port 39 of the fluid pressure control valve 34, has a volume control or shut-off valve 42, and a fluid pressure control valve 43 mounted in the line 30 between the shut-off valve 42 and the fluid pressure pump 28. The fluid pressure control valve 43 has a fluid pressure relief line 44 connected thereto and extended to and connected with the fluid return conduit line 33.

Each traction wheel 22 is torque mounted on the end of a shaft 45 of a respective fluid pressure motor 46, each shaft having a rotor 47 with guided vanes 48 extended by springs 49, seated in the rotor 47 with the guided vanes having the outer ends thereof constantly pressing against and sliding inside of the liner 50. Each liner 50 fits tightly inside of the respective housing 51 and contains fluid pressure relief slots 52 and 53 to relieve unnecessary fluid pressure between the port 54 and the contact of the rotor with the liner, and to relieve unnecessary fluid pressure between the port 55 and the contact of the rotor with the liner.

Each fluid pressure motor 46 has a closure plate 56 with matching bolt holes 57 to holes 58 for the anchor bolts 59 to bolt the fluid pressure motor 46 to the flange 60 of the mower base 20.

Figure 3:
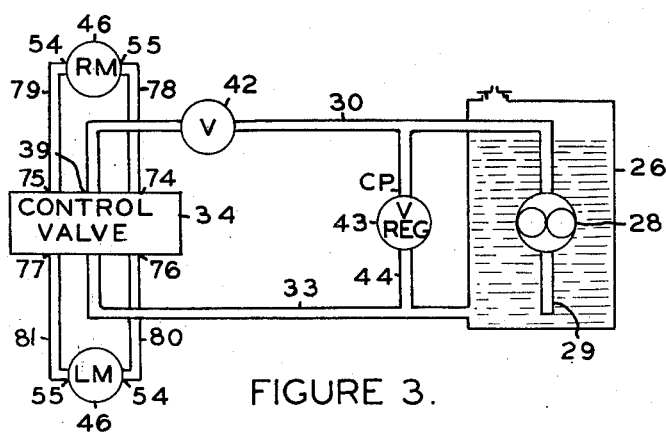
Figure 3 is a fluid circuit diagram of the fluid motors, valves, sump, pump and fluid connecting conduit lines.
Figure 4:
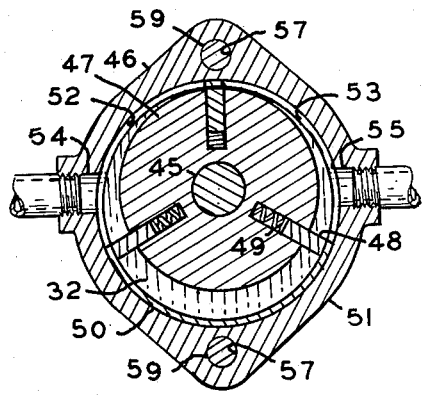
Figure 4 is an enlarged broken view of the interior construction of either fluid motor for the traction wheels.
Figure 6:
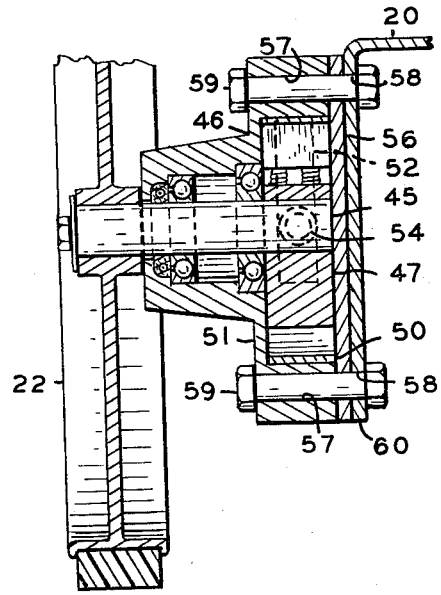
Figure 6 is an enlarged broken view of the interior construction of either fluid motor attached to a fragment of the mower base and connected with a traction wheel.
Figure 5:
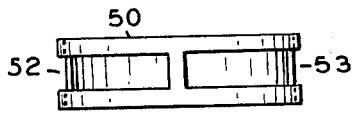
Figure 5 is an enlarged view of one fluid motor liner illustrating the pressure relief slots therein.
Figure 18:
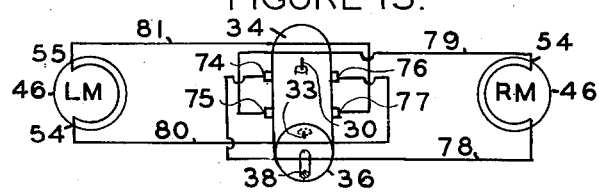
Figure 18 is a diagrammatic view of the fluid control lines from the control valve ports to the fluid motors.

The fluid pressure motors 46 are alike but for reference purposes in the fluid flow diagrams illustrated in Figures 3 and 18 the left motor is referred to as LM and the right motor is referred to as RM the observation being taken from the rear of the mower for designation.

The fluid pressure control valve 34 being of cylindrical shape is fitted with a slidable piston 61 having portions of the upper half of the piston cut away to form gates 62, 63, 64 and 65, each gate being fitted to the cylindrical shape, and forming ports 66, 67, and 68. The lower central portion of the slidable pistons 61 is cut away to form a longitudinal and cross port 69, and a by-pass port 70 is located between gates 63 and 64, opening into ports 67 and 69. Longitudinal relief ports 71 and 72 pass through the lengths of the piston opening into the ends of control valve 34 and relief ports 73 are located in gates 62 and 65. The piston is actuated from the exterior of the control valve 34 by the extended valve slide rod 38.

The fluid pressure control valve 34 is provided with side ports 74, 75, 76 and 77. A fluid conduit line 78 is connected to port 74 and extends to and is connected with port 55 of the right motor, fluid conduit line 79 extends to and is connected with port 54 of the right motor, fluid conduit line 80 is connected with port 76 and is extended to and connected with port 54 of the left motor, and fluid conduit line 81 is connected with port 77 and extends to and is connected with port 55 of the left motor.

Figure 7:
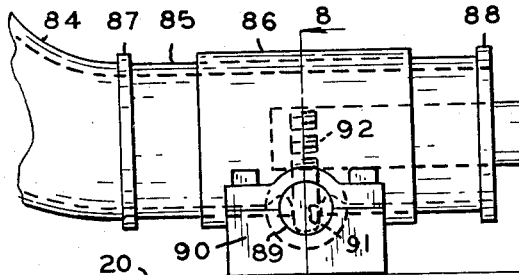
Figure 7 is an enlarged broken view illustrating one end of the tongue slidably mounted and journaled in a sleeve fulcrumed to a base mounting, a portion of the control valve with the actuator connections to the control valve in neutral position.
Figure 8:
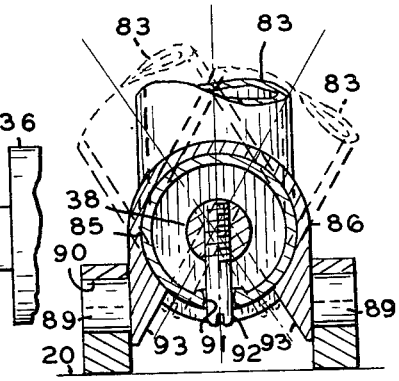
Figure 8 is a cross sectional view taken on line 8—8 of Figure 7 with the exception that the tongue is dotted in the right and left turn positions for actuation of the control valve.

The handle 82 connected with the tongue 83 is normally arranged at the proper height for an operator's hands and the tongue slopes downwardly and forwardly to a bend 84 in the tongue, then normally levels off to a horizontal section 85 as illustrated in Figure 7. The normally horizontal positioned section 85 is slidably arranged in a sleeve 86 and has stop members 87 and 88 fixed on the section 85, the stops being spaced from the ends of the sleeve 86 to limit the sliding movement of the section 85 in the sleeve to correspond with the movement of the slidable piston 61.

The sleeve 86 is provided with a pair of trunnions 89 with the longitudinal axis of the trunnions approximately intersecting the bottom of the section 85 in a transverse direction. The trunnions 89 are supported by bearings 90 fixed to mower base 20. The normally horizontal section 85 is provided with an opening 91 in the central lower portion thereof to receive and operate the actuator pin 92. The actuator pin 92 is preferably threaded into the piston valve slide rod 38 near the end thereof, and extends downward into the opening 91. The sleeve 86 is cut away on the lower portion thereof to allow the actuator pin 92 to move on valve slide rod in an arc between the trunnion bosses 93.

In the operation of the mower it is obvious from the description that an operator may start the prime mover 23, take hold of the handles 82 in the neutral driving position with the tongue 83 positioned as illustrated in Figures 1, 2, 7 and 8, in solid lines. His hands with the handles will find their natural position in height with a result that the tongue 83 and normal horizontal section 85 will fulcrum with the sleeve 86 on trunnions 89 to the extreme position if necessary as illustrated in Figure 9, or the opposite extreme position if necessary indicated by line 94.

Figure 10:
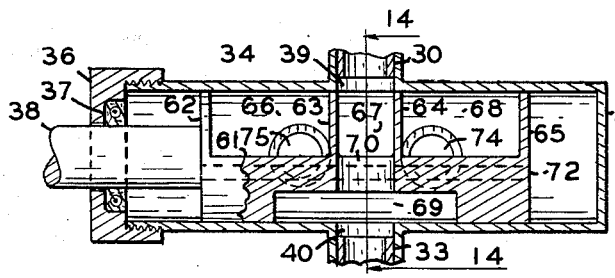
Figure 10 is an enlarged longitudinal broken view through the central portion of the control valve illustrating the neutral position of the multiple port slide piston.
Figure 14:
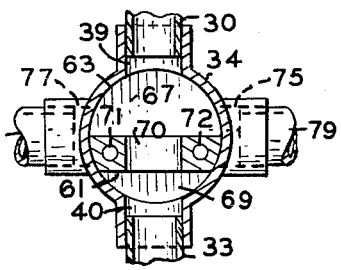
Figure 14 is a cross sectional view taken on line 14—14 of Figure 10.

The prime mover 23 actuates the fluid pressure pump 28, the fluid 32 in the reservoir 26 is drawn through suction pipe 29, forced through pump 28 into fluid pressure conduit line 30, through volume control or shut-off valve 42 when open, into fluid inlet port 39, and when the slidable piston 61 is in neutral position illustrated in Figure 10, the fluid flows under low pressure downward through port 67, by-pass port 70, port 69 into fluid relief port 40, and fluid return conduit line 33 to sump or reservoir 26. The fluid pressure regulating or control valve 43 regulates the pressure in the line 30 when in other than neutral position by means of riser line 95 and relief line 44.

Figure 11:
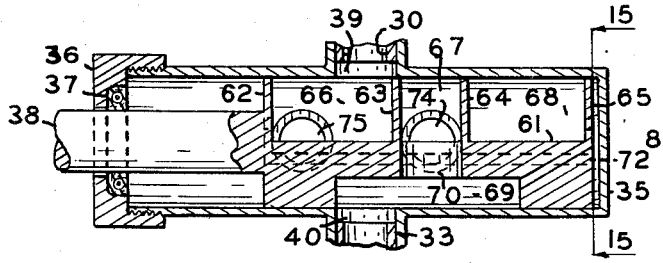
Figure 11 is a view similar to Figure 10 with the exception that the multiple port slide piston is moved forward in the control valve cylinder for the forward drive actuation of the mower.
Figure 15:
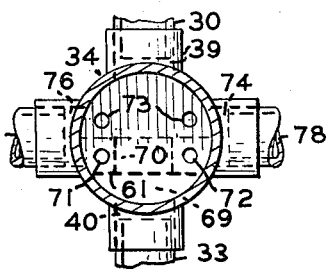
Figure 15 is a cross sectional view taken on line 15—15 of Figure 11.

When the handle 82 is in a horizontal position as illustrated in Figure 1 and pushed forward the piston 61 is pushed forward in the control valve cylinder 34 as illustrated in Figure 11. The fluid 32 passes through inlet port 39, port 66, outward through ports 75 and 77, fluid pressure conduit lines 81 and 79, into port 55 of the left motor and port 54 of the right motor thus rotating the fluid motors to actuate the traction wheels 22 in a forward driving direction. The return fluid from the fluid motors flows through ports 54LM, 55RM, fluid pressure conduit lines 78 and 80, ports 74 and 76 of the fluid control valve 34, ports 67, 70, 69 of slidable piston 61 and enters the fluid return line 33 to the sump or reservoir 26 by fluid relief port 40.

Figure 9:
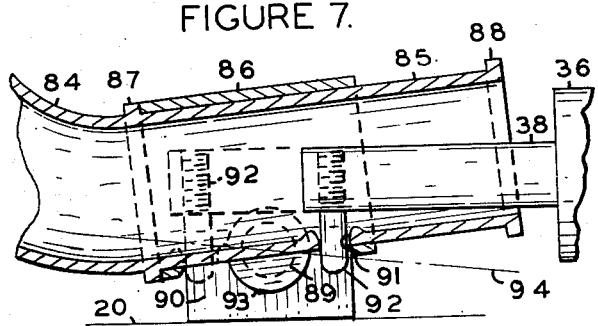
Figure 9 is a view similar to Figure 7 with the exception that the outer portions are broken away to show the interior, the tongue slid forward with the actuator parts of the control valve for a forward drive position, and the tongue with the sleeve are tilted on the fulcrum connection thereof.
Figure 12:
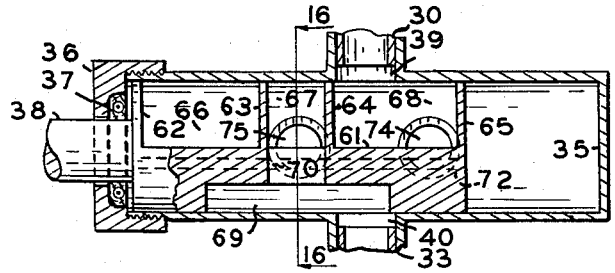
Figure 12 is a view similar to Figure 10 with the multiple port slide piston moved to the rear of the control valve cylinder for a reverse drive actuation of the mower.
Figure 16:
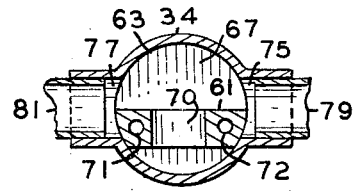
Figure 16 is a cross sectional view taken on line 16—16 of Figure 12.
Figure 13:
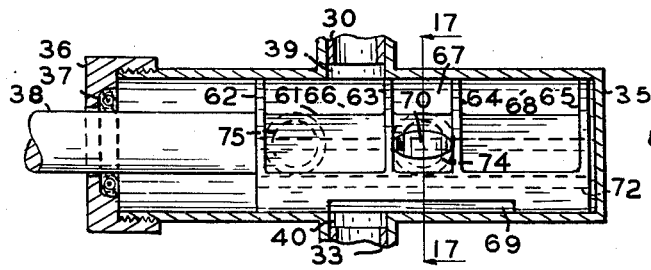
Figure 13 is a view similar to Figure 11 with the multiple port piston rotated a fraction of a turn toward the right of the mower for a right turn drive.

When the operator desires to reverse the fluid motors 46 to drive the mower in a rearward direction he pulls rearward on the mower handles and causes the slidable piston to be moved into the position illustrated in Figures 12 and 16, and the position of dotted actuator pin 92 in Figure 9. The fluid then flows through port 68, outward through ports 74 and 76, fluid pressure conduit lines 78 and 80, through the fluid motors and returns through fluid conduit lines 79 and 81, ports 67, 70, and 69 to the fluid return line 33.

Figure 17:
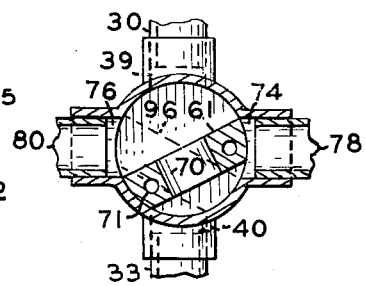
Figure 17 is a cross sectional view taken on line 17—17 of Figure 13.

To drive only one wheel for a turn whether it be right or left when driving in a forwardly or rearwardly direction it is only necessary to move the handles and tongue toward the direction to be turned. The tongue section 85 rotates a fraction of a turn in the sleeve 86 to move the outer end of the actuator pin 92 to one of the dotted positions illustrated in Figure 8. The valve slide rod will rotate toward the selected turn, turn the slidable piston 61 either as illustrated in Figure 17 or the reverse direction as indicated by the dotted lines 96 thus shutting off the fluid pressure flow to the traction wheel travelling on the inside of the curve.

The preferred form of the invention is illustrated and described and with the knowledge of similar forms the following claim is drawn to the scope thereof.

What I claim as new and desire to secure by Letters Patent is:

A control valve for a mower having fluid driven wheel motors operable from a fluid pressure pump and conduits connected between the pump, the control valve, the wheel motors and a sump for the pump, said valve comprising: a cylinder, said cylinder being hollow and elongated, heads closing the ends of the cylinder, said cylinder being relatively horizontal, a piston, said piston being shorter than the length of said cylinder and fitted slidably within said cylinder, said piston being turnable about its longitudinal axis, actuator means, said actuator means being connected to slide said piston and to turn said piston, a top port located substantially in the midlength of the cylinder, a bottom port located in the midlength of the cylinder below said top port, a right forward port, a left forward port, a right rearward port, a left rearward port, the forward ports being located on the sides of the cylinder spaced forwardly from the top port, the rearward ports being located on the sides of the cylinder spaced rearwardly from the top port, said slidable piston having a vertical by-pass opening vertically therethrough located in the midlength thereof to by-pass fluid from the top port to and through the bottom relief port when the piston is substantially centered midlength through the cylinder, said piston having the upper half thereof cut away to form fluid transfer passageways forwardly and rearwardly of said vertical by-pass opening with gates remaining to confine the fluid transfer passageways transversely across the piston and cylinder so as to pass fluid under pressure from the top port through the rearward fluid transfer passageway to and through the rearward ports when the piston is moved forwardly in the cylinder and receives returned fluid through the forward cylinder ports and vertical by-pass to and through the bottom port; when the piston is moved rearwardly in the cylinder the fluid under pressure flows from the top port through the forward transfer passageway to and through the forward ports and the fluid returns from the wheel motors through the rear cylinder ports and vertical by-pass to and through the bottom port and is conducted to the sump; and when the top of the piston is turned on its longitudinal axis toward the right the left side ports are closed, and when the piston is turned to the left the right side ports are closed, thus driving either the right or left wheel motor through the remaining open ports respectively and the opposite motor is idling without fluid pressure.

References Cited in the file of this patent

UNITED STATES PATENTS

| | | |
|---|---|---|
| 2,329,372 | Hitch | Sept. 14, 1943 |
| 2,393,325 | Joy | Jan. 22, 1946 |
| 2,429,378 | Stuebner | Oct. 21, 1947 |
| 2,523,014 | Gooch | Sept. 19, 1950 |